United States Patent [19]
Hershey et al.

[11] Patent Number: 5,519,692
[45] Date of Patent: May 21, 1996

[54] GEOMETRIC HARMONIC MODULATION (GHM)-DIGITAL IMPLEMENTATION

[75] Inventors: John E. Hershey, Ballston Lake; Gary J. Saulnier, Rexford, both of N.Y.; Amer A. Hassan, Cary, N.C.

[73] Assignee: General Electric Company, Schenectady, N.Y.

[21] Appl. No.: 407,554

[22] Filed: Mar. 20, 1995

[51] Int. Cl.⁶ .................................................. H04K 1/00
[52] U.S. Cl. .................... 370/18; 370/23; 375/205; 375/208; 375/358; 375/295; 375/316; 455/38.1
[58] Field of Search ................................. 370/11, 12, 18, 370/19, 20, 21, 23, 50, 69.1, 121, 93, 94.1, 95.1, 95.3; 375/200, 205, 206, 295, 316, 208, 358; 455/38.1, 91, 130; 340/825.03, 825.04, 825.15, 825.52

[56] References Cited

U.S. PATENT DOCUMENTS

| | | | |
|---|---|---|---|
| 5,204,874 | 4/1993 | Falconer et al. | 375/200 |
| 5,218,619 | 6/1993 | Dent | 375/205 |
| 5,309,474 | 5/1994 | Gilhouser et al. | 370/18 |
| 5,398,258 | 3/1995 | Su et al. | 375/200 |

*Primary Examiner*—Alpus H. Hsu
*Assistant Examiner*—Ricky Q. Ngo
*Attorney, Agent, or Firm*—Lawrence P. Zale; Marvin Snyder

[57] ABSTRACT

A set of phases defining an 'address' and a 'spreading key' is selected. These are employed in determining a preamble waveform and a traffic waveform. The preamble carrier waveform is a sum of a set of tones each offset by its phase, whereas the traffic carrier waveform is the product of these same offset tones. The tones have frequencies which are geometrically increasing multiples of a fundamental frequency. The phases and magnitudes of the preamble and traffic carrier waveforms are determined and prestored in a transmit and receive unit storage device. An inverse discrete Fourier Transform unit (IDFT) in the transmit unit receives the phase preamble offsets and magnitudes from the storage unit and creates a preamble carrier signal transmitted to the receive unit which determines if the phases match those which it is to listen to. If not, the following message is ignored; if they are, the following message is despread and decoded. IDFT creates a traffic carrier waveform from the traffic phases and magnitudes. Binary information is encoded in the carrier, processed and transmitted to the receive unit. A discrete Fourier Transform unit converts the received signal into phases and magnitudes. A dot product unit determines a dot product of the phase and magnitudes of the received signal and the traffic carrier waveform over a number of frequencies. A decision unit determines a binary message from the dot product.

4 Claims, 2 Drawing Sheets

GEOMETRIC HARMONIC MODULATION (GHM)-DIGITAL IMPLEMENTATION

CROSS REFERENCES TO RELATED APPLICATIONS

This application is related to U.S. patent applications "Method Of Geometric Harmonic Modulation (GHM)" (Ser. No. 08/407,560), "Geometric Harmonic Modulation (GHM)—Analog Implementation" (Ser. No. 08/407,088), "Geometric Harmonic Modulation (GHM) For Combined Analog/Digital Transmissions" (Ser. No. 08/407,555) by Hershey, Saulnier, Hassan; "Dynamic Code Division Multiple Access Communication System" (Ser. No. 08/407,552) by Hershey, Hassan, Saulnier; "Correction Of Multipath Distortion In Wideband Carrier Signals" (Ser. No. 08/407,559) by Hershey, Saulnier; and "Interlaced Geometric Harmonic Modulation" (Ser. No. 08/407,551) by John Hershey all filed Mar. 20, 1995 assigned to the present assignee, now pending, and hereby incorporated by reference.

BACKGROUND OF THE INVENTION

1. Field of the Invention

This invention relates to electronic signal modulation, and more specifically, to spread spectrum modulation of binary messages.

2. Description of Related Art

Many systems provide for a plurality of transmitter and receiver pairs, "communicating pairs", to communicate simultaneously with little or no interference between communicating pairs. This may be accomplished by allocating a different communication frequency to each communicating pair, known as frequency division multiple access (FDMA). There are situations in which it is difficult or impossible to assign each communicating pair a unique frequency. This occurs when there are simply too many communicating pairs close to each other on a designated bandwidth.

Another access method, such as time division multiple access (TDMA), may be employed, wherein each communicating unit is assigned a "time slice" in which to communicate on the same frequency band. This causes the "time slices" to become shorter as the number of communicating pairs increases.

Since both FDMA and TDMA communicate on narrowly defined bands, they are both susceptible to narrowband interference. Another method employs a spreading each message from each communicating pair across the entire usable bandwidth. They are all specially encoded such that they may be separated at the receiver. These are known as spread spectrum techniques.

Spread spectrum techniques are those modulation techniques which require a transmission bandwidth that far exceeds the message information bandwidth. The spread spectrum modulation characteristics should not depend upon the individual message to be transmitted as is the case with some other wideband modulation schemes such as wideband FM. There are many spread spectrum mechanisms. They can be conveniently classified as: (i) direct sequence, (ii) frequency hopping, (iii) time hopping, and (iv) hybrids.

In direct sequence spread spectrum modulation, a wideband carrier signal is combined with the relatively narrowband message to yield an encoded wideband signal. A typical digital implementation would be to create a high speed random binary sequence in having an equal probability of being a one or zero at any particular time. This high speed binary sequence is added to a binary message sequence. The addition is typically done by exclusive-ORing ("XOR") the two sequences together. The bits of the message sequence are much longer in duration than the bits from the high speed random source and thus many random bits are used per information bit. The random bits are often referred to as "chips" and the relationship between the random sequence rate and the message rate is such that an integral number of chips are used per message bit. The code used to "spread" the signal at the transmit unit, is required in "despreading" the signal at the receive unit.

There are many uses for direct sequence spread spectrum techniques. One primary use is that of spectrum sharing. It is possible for a number of different communicating pairs to occupy the same bandwidth simultaneously without significant mutual interference. This is usually accomplished in direct sequence spread spectrum systems by assigning each communicating pair a different spectrum spreading code. This is known in the art as code division multiple access (CDMA).

Since the messages are spread over a large bandwidth, there is less possibility of loss of communications due to narrow bandwidth interference. The effect of the interference is therefore reduced by the bandwidth over which it is applied.

Typically, one problem with direct sequence spread spectrum communications and CDMA is synchronization. In order to function properly, the receiver must generate a signal from the spreading code which is the inverse from the transmitted spread spectrum signal, and do so at the same rate as the transmit unit. The receive unit must also correct relative phase discrepancies between the transmit and receive unit. This requires synchronization to be established and maintained at a tolerance finer than a single chip width. Further, the receiver must know the particular spreading code employed by the transmit unit in order to decode the signal and recover the message.

Currently there is a need for a simplified method of direct spread spectrum modulation which is not as sensitive as conventional systems to synchronization, and which does not require the spreading code in advance.

SUMMARY OF INVENTION

A digital implementation of geometric harmonic modulation (GHM) system communicates a binary message denoted by an 'address' of carrier phases. The address may identify a source, a transmitter type, a receiver, a group of receivers, or a message type. A waveform storage device for storing digital information.

Phases and magnitudes ($\phi_i^p, M_i^p$) defining a preamble carrier waveform, and traffic phases and magnitudes ($\phi_j^t, M_j^t$) defining a traffic carrier waveform are calculated from said phases of the address by a calculation unit and stored in a storage device. A digital modulation unit coupled to the storage device, operates in a preamble mode producing a preamble carrier signal from the preamble phases and magnitudes. It also operates in a traffic mode producing a preamble carrier signal from the traffic phases and magnitudes.

A binary encoder encodes the binary message intended to be transmitted in the traffic carrier waveform during the traffic mode to produce a digitally encoded spread spectrum signal for transmission through a channel.

At the receive unit, the phases are extracted during the preamble mode, and are used to construct a reference signal to be compared with the received signal. The comparison produces either a correlation of approximately 1 or −1, meaning that the signal matches, and is inverted, respectively. This comparison is converted on a bit by bit basis into the transmitted binary message.

Since all tones are multiples of a fundamental tone, having a phase of zero, locking onto the fundamental tone allows for simplified synchronization.

The present invention is particularly applicable to spread spectrum code division multiple access (CDMA) communication. Many communicating transmit/receive pairs may occupy the same bandwidth simultaneously with little interference. The amount of interference increases smoothly as the number of communicating pairs increases. There is little overhead organization required, as compared with time division multiple access (TDMA), and there is also no need to have the receive unit know the despreading code in advance. There is also flexibility in using the 'address' to apply to multiple receive units, to different message types, or to identify the originating transmit unit.

OBJECTS OF THE INVENTION

An object of the present invention is to provide a direct spread spectrum modulation and demodulation device.

Another object of the present invention is to provide a system for a spread spectrum communication device which is less sensitive to synchronization errors than conventional systems.

Another object of the present invention is to provide a simplified spread spectrum communications device as compared with conventional methods.

Another object of the present invention is to provide a spread spectrum communications device which is capable of being miniaturized.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE PREFERRED EMBODIMENT

Consider that the system supports a number of simultaneous users. Each user of the system signals one bit per symbol time defined as the reciprocal of the signaling rate R. The signaling waveform is a member of $\{_n\Phi,R;t)\}$ where $$W_n(\Phi, R; t) = \prod_{i=0}^{n} \sin(2^i \cdot 2\pi R t + \phi_i) \quad (1)$$

where n is the "order" of the function, $\Phi=(\phi_0,\phi_1,\ldots,\phi_n)$, and $$\phi_i \in \left\{ 0, -\frac{\pi}{2} \right\}.$$

For finite order, n, the functions and all of their derivatives are continuous in the interval $$\left( 0, \frac{1}{R} \right).$$

Figure 1A:
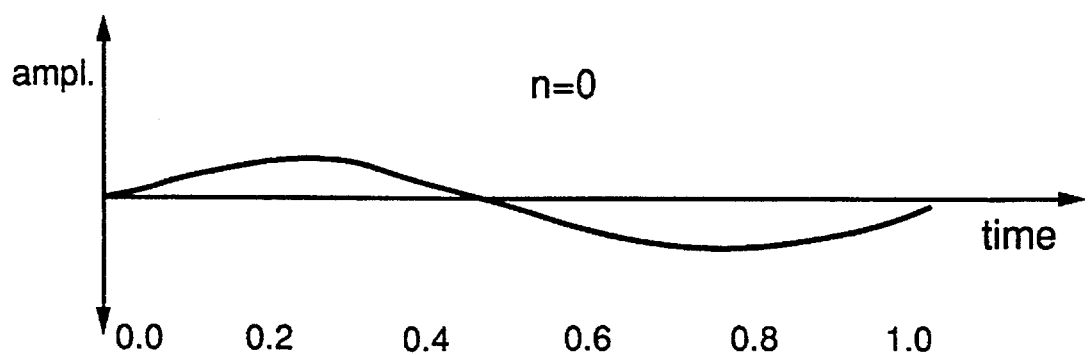
FIGS. 1a, 1b, 1c are graphs of the wave function $W_n(\underline{0},1;t)$ for n=0,3,6, respectively, used in connections with explaining the present invention.
Figure 1B:
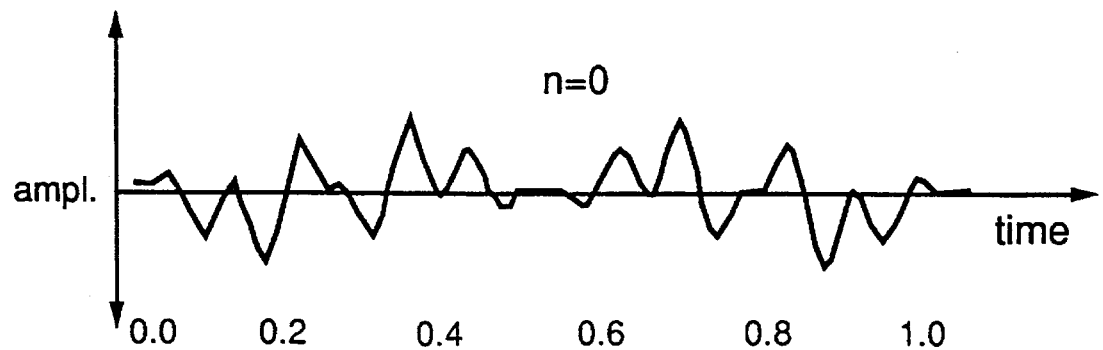
Figure 1C:
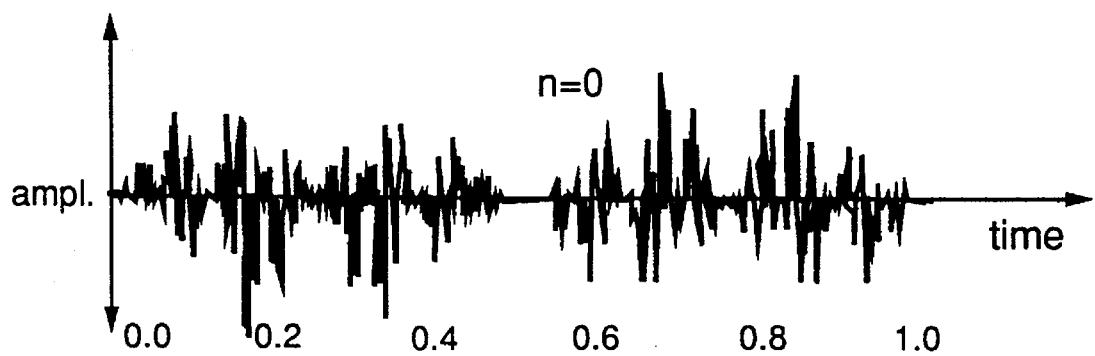

FIGS. 1a, 1b, 1c illustrate representative waveforms of $2^{n+1}/2 W_n(\Phi,1;t)$, namely $W_0(\underline{0},1;t)$, $W_3(\underline{0},1;t)$ and $W_6(\underline{0},1;t)$, respectively, where $\underline{0}$ indicates that all of the phases $\phi_i$ are zero. (For these examples, R=1).

If $\{b^{(i)}(m)\}$ is the binary message sent by the i-th user, the i-th user signal can be expressed as $s^{(i)}(t)=b^{(i)}(m)W_n(\Phi, R;\xi)\delta([\xi^{(i)}])$ where $\xi^{(i)}=R(t-\tau^{(i)})-m$, $\tau^{(i)}$ is the time of the start of the i-th transmission, [.] is the greatest integer function, and where $\delta(.)$ is the Kronecker delta function.

The composite signal, S(t), is then:

$$S(t) = \sum_{i=1}^{N} b^{(i)}(m) W_n(\Phi, R; \xi)\delta([\xi^{(i)}]). \quad (2)$$

where N is the number of users.

By writing $$\sin(2^i \cdot 2\pi R t + \phi_i) = \quad (3)$$
$$\frac{1}{2j} [\exp(j\{2^i \cdot 2\pi R t + \phi_i\}) - \exp(-j\{2^i \cdot 2\pi R t + \phi_i\})]$$

it is easily seen that Equation (1) can be expanded into a sum as $$W_n(\Phi, R; t) = 2^{-n} \sum_{k=1,3,5\ldots}^{2^{n+1}-1} \Theta\left(\frac{k-1}{2}\right) \begin{cases} (-1)^{n/2}\sin(k \cdot 2\pi R t + A \cdot \Phi) \text{ for } n, \text{ even} \\ (-1)^{(n-1)/2}\cos(k \cdot 2\pi R t + A \cdot \Phi) \text{ for } n, \text{ odd} \end{cases} \quad (4)$$

where $A=(\alpha_0,\alpha_1,\ldots,\alpha_n)$ is a binary representation of the summation index k with:

$$\alpha_i = (\pm 1) \text{ and } k = \sum_{i=0}^{n} \alpha_i \cdot 2^i,$$

$$\Phi = (\phi_0, \phi_1, \ldots \phi_n),$$

$$A \cdot \Phi = \sum_{i=0}^{n} \alpha_i \phi_i,$$

$\Theta(k)$, k=0,1,2, ... is the Thue-Morse sequence. The Thue-Morse sequence can be thought of the diagonal elements in the infinite Cartesian product $$\lim_{n \to \infty} H_n$$

where $H_n = H_{n-1} \otimes H_1$ and $$H_1 = \begin{pmatrix} 1 & 1 \\ 1 & -1 \end{pmatrix}.$$

(The first eight values, $\Theta(0)$–$\Theta(7)$, are (1,−1,−1,1,−1,1,1,−1).

When a message is to be sent, the transmit unit enters the synchronization or preamble mode. For an environment wherein there is negligible multipath, the transmit unit transmits a preamble signal for a series of cycles. A cycle is defined as the duration of time delimited by two successive negative to positive zero crossings.

A frequency of a master sinusoidal signal, or tone is selected. The master tone is divided down to produce frequencies of a plurality of tones. The lowest tone being a fundamental tone. Alternatively, a fundamental sinusoidal signal, or tone, having a fundamental frequency $2\pi f_0$ is selected. A plurality of tones having frequencies which are geometrically progressing multiples of a fundamental frequency, $2\pi f_0$ to result in n+1 tones.

Phases $\Phi = \{\phi_i, i=1, 2, 4, 8, \ldots 2^n\}$ for each of the tones, except for the fundamental tone which has a phase of zero, are selected. The phases $\Phi$ in a preferred embodiment, are either of two substantially separated values, such as 0 and $-\pi/2$ radians, which may be selectable by an operator Phases $\Phi$ are used as the spreading code for spreading an input signal across a frequency spectrum, and for despreading the signal at a receive unit. A preamble carrier waveform is constructed by summing the tones, each incorporating its phase. The preamble carrier waveform has the full transmit power distributed over the n+1 frequencies.

The phases $\Phi$ are also used as an operator selectable 'address' of an attached message. In one possible embodiment, each receive unit knows its own 'address'. The receive unit constantly monitors preamble signals to identify the phase 'address'. If it encounters an 'address' which matches its own, it then despreads and decodes the appended message using its 'address'.

In an alternative embodiment, the phases $\Phi$ define a transmit unit ID. Each receive unit knows which transmit unit to 'pay attention to' at a given point in time. If the phase 'address' matches a transmitter which the receive unit is supposed to listen to, it despreads and decodes this appended message.

In still another embodiment, the phase 'address' is used to identify message types. Each receive unit knows which message type to monitor in a given situation. For example, a 'broadcast' message type 'address' will be received by all receive units, with a 'group 2' message type being despread and decoded by receive units which are presently designated as 'group 2' receive units, while other receive unit presently designated as 'group 1' or 'group 3' will ignore the message.

After completion of the preamble mode, the present invention enters the signaling or traffic mode. A traffic carrier waveform is employed which is a product of a plurality of sinusoidal waves over a cycle, as defined above. Phases $\Phi$ correspond to a predetermined address, or despreading 'key'.

If n is selected to be 5, then 6 tones, each with their own phase $\phi_i$, are transmitted by transmit unit 60 during the preamble mode.

After transmit unit 60 enters the traffic mode, IDFT 67 creates $2^n = 2^5 = 32$ tones, with each tone having a phase, for n selected to be 5.

The set of phases, $\Phi$, denote both an 'address' and determine the spreading code. Once the set of phases is acquired during the preamble mode, they are stored. If the phases $\Phi$ correspond to an 'address' which receive unit 70 is searching for, a message immediately following the preamble signal is despread and decoded using the phases $\Phi$ acquired during the preamble mode.

Since all tones employed by the present invention are multiples of a fundamental tone, and the fundamental tone has a phase of zero, synchronization is much simpler than conventional direct spread spectrum systems.

Also, the implementation described above is a very simple circuit. This circuit may be miniaturized and employed in small areas which conventional direct spread spectrum devices would not be able to be employed.

Figure 2:
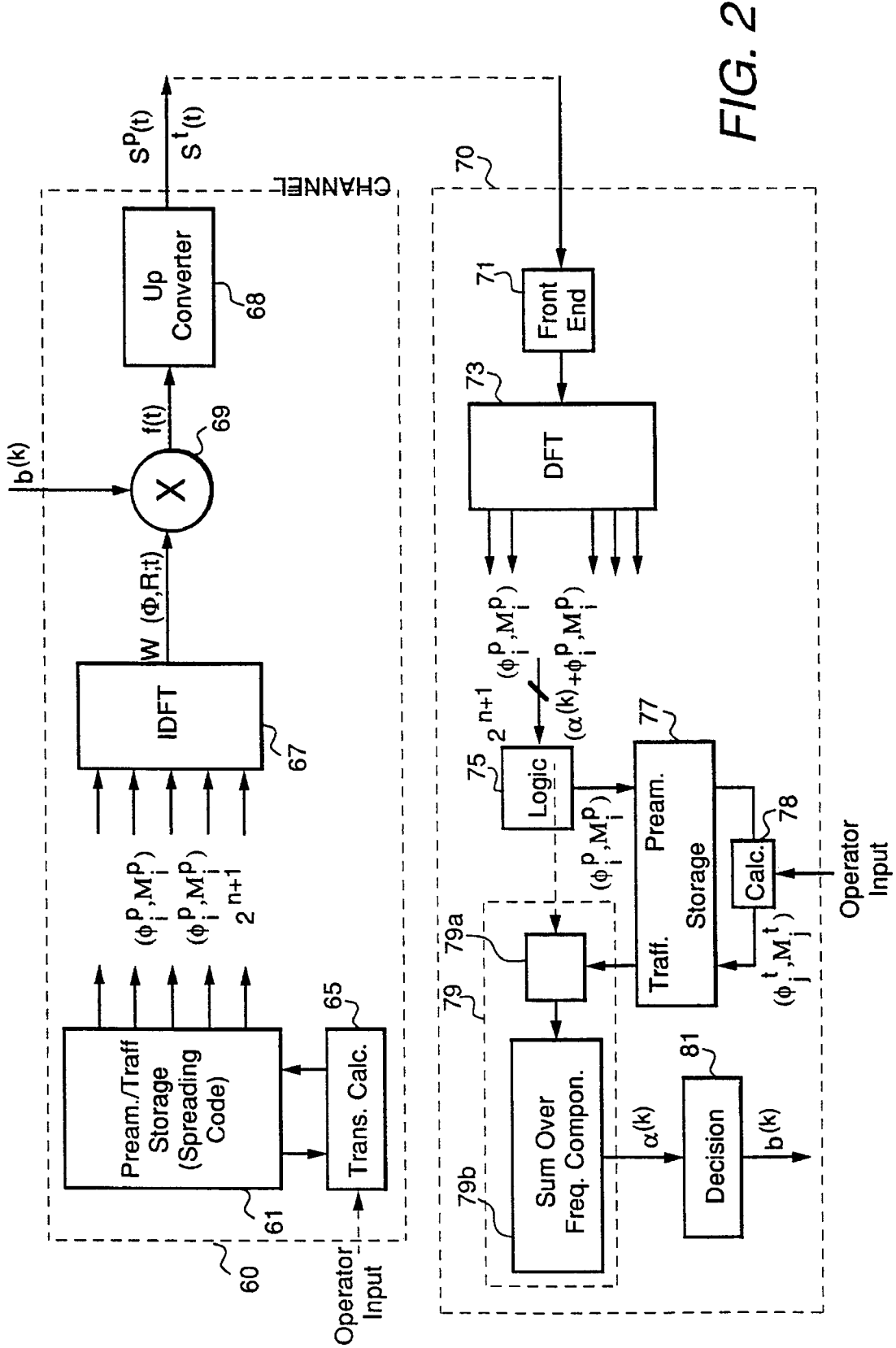
FIG. 2 is a simplified block diagram of a digital embodiment of a communications system according to the present invention.

In FIG. 2, a digital implementation according to the present invention is shown. A fundamental tone is selected. A set of n tones is then selected, preferably having frequencies being geometrically increasing multiples of the fundamental tone, $2^i * 2\pi f_0$ i=0,1,2 . . . n, where $2\pi f_0$ is the frequency of the fundamental tone. These may be calculated from the fundamental tone. The magnitude $M^p$ of all frequencies, except for the n+1 tones selected to be employed in the preamble mode, will be set to zero. All non-zero magnitudes $M^p$ are set to an equal value.

A set of preamble phases, $\Phi^p = \{\Phi_0^p, \phi_1^p, \phi_2^p, \ldots \phi_n^p\}$, to be used as an 'address', and a spreading code, and may be provided by operator input for each tone. The phase and magnitude pairs $(\phi_i^p, M_i^p)$ for each tone of the preamble mode are prestored in a memory device 61.

The phases and magnitudes $(\phi_i^p, M_i^p)$ for the preamble mode are provided to an inverse discrete Fourier transform (IDFT) unit 67 during the preamble mode.

IDFF 67 creates time-varying preamble carrier waveform from the magnitudes and phases $(\phi_i^p, M_i^p)$ provided to it, which is the sum of the individual tones employing the phases.

The signal resulting from multiplier 69 is upconverted by an up converter 68 to a signal $s^p(t)$ which is transmitted through a channel to receive units 70.

In receive unit 70, the signal received during the preamble mode $r^p(t)$ is downconverted to baseband signal by a front end 71 and then passed to a discrete Fourier transform (DFT) unit 73 which determines n+1 phases and magnitudes $(\phi_i^p, M_i^p)$ for the n+1 preamble tones. A logic unit 75 determines if the phases $\phi$ match an 'address' which it is to monitor. The 'address' is previously stored in a storage unit 77. If there is a match, the message is one to be despread and decoded during a 'traffic' mode. This phase 'address' is used for despreading.

A transmit calculation unit 65 receives the preamble phases and magnitudes $(\phi_i^p, M_i^p)$ transmitted during the preamble mode and calculates the phases, and magnitudes $(\phi_j^t, M_j^t)$ of $2^n$ tones to be employed in the traffic mode. One such method of calculating the phases and magnitudes $(\phi_j^t, M_j^t)$ is to determine traffic carrier waveform $W_n(\Phi, R; t)$ according to Eqs. (1) and (4) above. A discrete Fourier Transform is run on samples of this waveform. The resultant phases and magnitudes $(\phi_j^t, M_j^t)$ are stored by transmit calculation unit 65 in storage 61.

When the present invention begins operating in its traffic mode, $2^n$ traffic phases and magnitudes $(\phi_i^t, M_i^t)$ stored in storage device 65, are provided to IDFT unit 67. IDFT unit 67 creates a traffic carrier waveform $W_n(\Phi, R; t)$, being the product of the n+1 tones each employing their corresponding 'key' or phase.

When the present invention begins operating in its traffic mode, $2^n$ traffic phases and magnitudes $(\phi_i^t, M_i^t)$ which have been previously calculated and stored in storage device 65, are provided to IDFT unit 67. IDFT unit 67 creates a traffic carrier waveform $W_n(\Phi, R; t)$, having $2^n$ tones, being the product of the n+1 preamble tones each employing their corresponding 'key' or phase.

The traffic carrier waveform $W_n(\Phi, R; t)$ is passed to a multiplier 69, along with a binary stream $b^{(k)}$ desired to be transmitted. Binary stream $b^{(k)}$ has been previously converted into a series of values of 1 and −1, representing a series of binary logical values. Multiplier 69 encodes the binary stream by either inverting complex carrier signal $W_n(\Phi,R;t)$ for a bit period, or leaves it unchanged, for a −1 and 1 value, respectively. Inverting the signal is also equivalent to shifting the carrier signal by a phase shift $\alpha=\pi$.

Multiplier 51 passes the encoded signal to up converter 68 to pass a signal through a channel to receive units 70.

Signal r'(t) is received by receive unit 70 directly after the preamble mode. Signal r'(t) is down converted by a front end 71. The down converted signal is sampled and fed to DFT unit 73. DFT unit 73 extracts phases and magnitudes from each of the component sinusoids of the sampled signal. This results in $2^n+1$ tones, $2^n$ phases and magnitudes $(\phi_j^t,M_j^t)$, many of which are zero.

A logic unit 75 receives the $2^n+1$ frequencies, phases and magnitudes from the DFT and passes them to a dot product unit 79.

Storage device 77 holds $2^n$ traffic phases and corresponding magnitudes $(\phi_j^t,M_j^t)$ which were previously calculated and stored. These should be the same those in storage device 61 in transmit unit 10.

In an alternative embodiment, a receive calculation unit 78 calculates a set of $2^n$ traffic phases, and corresponding magnitudes $(\phi_j^t,M_j^t)$ from the n+1 preamble phases and magnitudes $(\phi_i^P,M_i^P)$ obtained during the preamble mode, as described above in reference to the transmit calculation unit 65. These traffic phases and magnitudes $(\phi_j^t,M_j^t)$ are used as the despreading code.

Dot product unit 79 employs a correlation unit 79a that correlates the output of DFT unit 73, $(\alpha^{(k)}+\phi_j^t,M_j^t)$, with the traffic phases and magnitudes $(\phi_j^t,M_j^t)$ of storage device 77 to determine phases due to the binary signal $\alpha^{(k)}$.

The correlation result is then summed over all frequency components by a summer 79b to result in the dot product.

The dot product from dot product unit 79 is compared to a predetermined threshold to make a data bit decisions, resulting in binary message $b^{(k)}$ being the original binary information provided to transmit unit 60.

The present invention may be easily miniaturized since it may be constructed from small digital chips. It also directly produces spread spectrum carrier wave, resistant to interference at narrowband interference. It also allows code division multiple access (CDMA) requiring little or no overhead control.

While several presently preferred embodiments of the novel invention have been described in detail herein, many modifications and variations will now become apparent to those skilled in the art. It is, therefore, to be understood that the appended claims are intended to cover all such modifications and variations as fall within the true spirit of the invention.

What we claim is:

1. A geometric harmonic modulation (GHM) transmit unit for transmitting a binary message to an intended receiver denoted by an address being a set of n+1 phase offsets comprising:

a) a storage device for storing digital information;

b) a calculation unit coupled to the storage device for producing preamble phases and magnitudes $(\phi_i^P,M_i^P)$ defining a preamble carrier waveform, and traffic phases and magnitudes $(\phi_j^t,M_j^t)$ defining a traffic carrier waveform from said set of phase offsets, and for storing the preamble and traffic phases and magnitudes in the storage device;

c) a digital modulation unit coupled to the storage device, for operating in a preamble mode producing a preamble carrier signal from the preamble phases and magnitudes, and for operating in a traffic mode producing a traffic carrier signal from the traffic phases and magnitudes; and d) a binary encoder coupled to the digital modulation unit for encoding said binary message desired to be transmitted in the traffic carrier waveform when the digital modulation unit is operating in the traffic mode to produce an encoded signal for transmission.

2. A GHM transmit unit of claim 1 wherein the calculation unit comprises:

a) a preamble waveform source for producing samples of a preamble carrier waveform defined by:

$$W_n(\Phi, R; t) = \sum_{i=0}^{n} \sin(2^i \cdot 2\pi Rt + \phi_i)$$

where n is an order of the function being one less than the number of phase offsets in said address, $\Phi=(\phi_0,\phi_1,\ldots,\phi_n)$ are said set of phase offsets of said address, t is time, and R is an inverse of a rate at which said binary message is to be transmitted;

b) a traffic waveform source for producing samples of a traffic carrier waveform defined by:

$$W_n(\Phi, R; t) = \prod_{i=0}^{n} \sin(2^i \cdot 2\pi Rt + \phi_i); \text{ and}$$

c) a transform unit for producing phases and magnitudes $(\phi_i^P,M_i^P)$, $(\phi_j^t,M_j^t)$ from the preamble and traffic carrier waveform samples, respectively, and storing these in the transmit unit storage device.

3. A geometric harmonic modulation (GHM) receive unit for decoding a binary message encoded, along with an address being a set of n+1 phase offsets, in a received signal comprising:

a) storage device for storing digital information;

b) calculation unit coupled to the storage device for producing preamble phases and magnitudes $(\phi_i^P,M_i^P)$ defining a preamble carrier waveform, and traffic phase offsets and magnitudes $(\phi_j^t,M_j^t)$ defining a traffic carrier waveform from a set of n+1 phase offsets of an address desired to be monitored, and for storing the preamble and traffic phases and magnitudes in the storage device;

c) digital demodulation unit coupled to the storage device, for determining a set of received phase offsets and magnitudes from said received signal;

d) a dot product unit coupled to the storage device for determining a dot product between traffic phase offsets and magnitudes and phase offsets and magnitudes provided to it;

e) a logic unit coupled to the digital demodulation unit, the storage device, and the logic dot product unit, for comparing the received phase offsets and magnitudes to the preamble phase offsets and magnitudes for synchronization with the received signal, the logic unit passing the received phase offsets and magnitudes of subsequent signals to the dot product unit when the received phase offsets match the phase offsets of the address desired to be monitored; and f) a decision device coupled to the dot product unit for receiving the messages passed by the logic unit and for providing a binary message by producing a first logical value when the dot product is above a threshold, and a second logical value otherwise.

4. A GHM receive unit of claim 3 wherein the calculation unit comprises:

a) a preamble waveform source for producing samples of a preamble carrier waveform described by:

$$W_n(\Phi, R; t) = \sum_{i=0}^{n} \sin(2^i \cdot 2\pi Rt + \phi_i)$$

where n is an order of the function being one less than the number of phase offsets in said address, $\Phi = (\phi_0 \phi_1, \ldots, \phi_n)$ are said set of phase offsets of said address, t is time, and R is an inverse of a rate at which said binary message is to be transmitted.

b) a traffic waveform source for producing samples of a traffic carrier waveform defined by:

$$W_n(\Phi, R; t) = \prod_{i=0}^{n} \sin(2^i \cdot 2\pi Rt + \phi_i); \text{ and}$$

c) a transform unit for producing phases and magnitudes from the preamble and traffic carrier waveform samples, respectively, and storing these in the receive unit storage device.

* * * * *

UNITED STATES PATENT AND TRADEMARK OFFICE
CERTIFICATE OF CORRECTION

PATENT NO. : 5,519,692

DATED : May 21, 1996 iNVENTOR(S) : Hershey, Saulnier, Hassan

It is certified that error appears in the abocve-identified patent and that said Letters Patent is hereby corrected as show below:

col. 3, line 64, delete "$\{_n\Phi,R;t\}$" and substitute $--\{W_n(\Phi,R;t)\}--$;

col. 4, lines 13-14, delete "$2_{n+1}/2W_n(\Phi,1;t)$" and substitute $--2^{\frac{n+1}{2}}W_n(\Phi,1;t)--$.

Signed and Sealed this

Twentieth Day of August, 1996

Attest:

BRUCE LEHMAN

*Attesting Officer*  *Commissioner of Patents and Trademarks*